US009111341B2

(12) United States Patent
Wang et al.

(10) Patent No.: US 9,111,341 B2
(45) Date of Patent: Aug. 18, 2015

(54) WATERMARKING IMAGE BLOCK DIVISION METHOD AND DEVICE FOR WESTERN LANGUAGE WATERMARKING PROCESSING

(75) Inventors: Gaoyang Wang, Beijing (CN); Wenfa Qi, Beijing (CN); Lidong Wang, Beijing (CN); Bin Yang, Beijing (CN)

(73) Assignees: Peking University Founder Group Co., Ltd., Beijing (CN); Peking University, Beijing (CN); Beijing Founder Electronics Co., Ltd., Beijing (CN); Peking Universit Founder R & D Center, Beijing (CN)

( * ) Notice: Subject to any disclaimer, the term of this patent is extended or adjusted under 35 U.S.C. 154(b) by 233 days.

(21) Appl. No.: 13/997,258

(22) PCT Filed: Dec. 23, 2011

(86) PCT No.: PCT/CN2011/084577
§ 371 (c)(1), (2), (4) Date: Sep. 12, 2013

(87) PCT Pub. No.: WO2012/083882
PCT Pub. Date: Jun. 28, 2012

(65) Prior Publication Data

US 2014/0003649 A1 Jan. 2, 2014

(30) Foreign Application Priority Data

Dec. 23, 2010 (CN) .......................... 2010 1 0620424

(51) Int. Cl.
*G06K 9/00* (2006.01)
*G06T 1/00* (2006.01)
*G06K 9/34* (2006.01)

(52) U.S. Cl.
CPC .............. *G06T 1/0021* (2013.01); *G06K 9/348* (2013.01); *G06T 2201/0051* (2013.01); *G06T 2201/0062* (2013.01); *G06T 2201/0083* (2013.01)

(58) Field of Classification Search
None
See application file for complete search history.

(56) References Cited

U.S. PATENT DOCUMENTS

| | | | | |
|---|---|---|---|---|
| 6,983,056 | B1 * | 1/2006 | Amano | 382/100 |
| 2005/0262351 | A1 * | 11/2005 | Levy | 713/176 |
| 2006/0075241 | A1 * | 4/2006 | Deguillaume et al. | 713/176 |
| 2007/0014429 | A1 * | 1/2007 | He et al. | 382/100 |

* cited by examiner

*Primary Examiner* — Atiba O Fitzpatrick
(74) *Attorney, Agent, or Firm* — Lathrop & Gage LLP

(57) ABSTRACT

The application provides a method for partitioning a watermark image with western language characters, comprising: partitioning a western language characters image along rows and columns to form a plurality of character image blocks; identifying valid character image blocks from the formed character image blocks; counting sizes of the valid character image blocks to determine if the image corresponds to a document with a large font size or a document with a small font size; dividing words in the image into a plurality of groups, wherein each divided group in the document with large font size has different numbers of words from that with small font size; and dividing equally the divided word groups into multiple portions corresponding to watermark image blocks. The application further provides a device for partitioning a watermark image with western language characters. The operability of watermark embedding process can be ensured through the above technical solution.

11 Claims, 8 Drawing Sheets partitioning the western characters image along rows and columns to form a plurality of character image blocks — S 10 identifying valid character image blocks from the formed character image blocks — S 20 counting sizes of the valid character image blocks to determine whether the western character image corresponds to a document with large font size or a document with small font size — S 30 respectively dividing the words in the image are divided into a plurality of groups, wherein each divided group in the document with large font size has different numbers of words from that with small font size — S 40 equally dividing the word groups into multiple portions corresponding to watermark image blocks — S 50

Here is a Jack’s

Here is a Jack’s sample, to show water-mark.

Here is a Jack’s sample, to show water-mark.

Here is a Jack's sample, to show water-mark.

FIG. 8C

Here is a Jack's sample, to

FIG. 8D

Here is a Jack's sample, to

FIG. 8E

WATERMARKING IMAGE BLOCK DIVISION METHOD AND DEVICE FOR WESTERN LANGUAGE WATERMARKING PROCESSING

TECHNICAL FIELD

The application relates to digital typesetting field, in particular to methods and devices for partitioning watermark images with western language characters.

BACKGROUND

With the development and wide uses of E-commerce and electronic communications and transactions, government agencies, enterprises and public institutions, political party affiliated institutions and government-affiliated institutions, and organizations and agencies for national security, etc. will process a great number of written materials including important files and documents, such as contracts, classified or confidential documents and the like. The copyright protection issues and the protection and security of the contents of these documents are critically important. The digital watermark technology provides one approach to addressing the above issues.

Digital watermarking embeds specific information in digital signals which may be audio signals, image signals, video signals, or the like. Watermarks may be classified as appeared watermarks and concealed watermarks. The former is visible and the included information can be shown to the user when they are watching the image or video. Generally, the appeared watermark comprises a name or a symbol of the copyright owner. The TV station's logo arranged in a corner of television shows is one type of the appeared watermark.

In a concealed watermark, the information in numeric data is embedded in the audio signals, image signals, or video signals and is generally invisible. An important application of the concealed watermark is copyright protection, which is desired to avoid or prevent the unauthorized medium files from duplicating and copying. The steganography, which allows the users to communicate with each other using the information concealed in the digital signals, is also an application of the digital watermark. The annotated data in a digital picture, which can record the time for capturing a picture, the aperture and shutter speed used for capturing the picture, even the brand of the camera used or other information for the captured picture, is also an application of the digital watermark. Some file formats may comprise the above and other information as additional information referred to as "metadata".

In addition, many text files including a great number of western language documents may be disseminated or transmitted not only in digital form but also in printed or photocopied form on paper or the like. With the increase of internationalization, communication via western language documents becomes more frequent, and thus there is a strong demand for protecting such western language documents. With the rapid development of the digital technology, communications via documents in printed or photocopied form on paper based on document in digital form have become considerably popular and ubiquitous, so that much important or classified information is leaked during dissemination or transmission of documentation in paper. Thus, it is important to research out such a binary text watermark technology that is capable protecting the information from being printed and photocopied.

1. Chinese Patent Application No. 200710121642.7 discloses "a method and device for embedding digital watermark into a binary image". The disclosed method comprises a step of partitioning a part of or the whole binary image into at least two watermark image blocks, a step of obtaining multiple groups according to the number of black pixels in each watermark image block, a step of applying Hadamard transform to data in each group. The watermark signals are embedded through a quantitative method, and the pixels to be changed in each watermark image are transformed with the Hadamard transform, so as to facilitate embedding or extracting of the watermark.

2. Chinese Patent Application No. 200810055770.0 discloses "a method and device for embedding digital watermark into a binary text image". The disclosed method comprises a step of partitioning a part of or the whole binary image into a part to be embedded and a part to be adjusted, a step of calculating an average value of the number of black pixels in each group of the part to be embedded and the part to be adjusted, a step of determining a color change parameter according to the calculated average value and the number of black pixels in each group of the part to be embedded, and a step of adjusting the number of black pixels in each group of the part to be embedded and the part to be adjusted according to the color change parameter, so as to embed the watermark.

3. Chinese Patent Application No. 200810055770.0 discloses "a method and a device for embedding and extracting digital watermark into and from a black-and-white binary text image". The disclosed method for embedding comprises a step of locating and grouping the valid character zones to obtain the number of the black pixels in each character zone. A first number of pixels to be turned will be calculated according to relation between the number of black pixels in respective character zones, watermark information bits string, and a first step length. The method for embedding further comprises a step of turning pixels in each character zone according to the first number. The disclosed method for extracting comprises a step of locating valid character zones in a text image; a step of grouping the valid character zones to obtain the number of the black pixels in each character zone; and a step of extracting a bits string of embedded watermark information according to relation between the number of black pixels in respective character zones and a first step length.

In the above mentioned prior solutions, it is important that the watermark image block is served as the zone to be embedded. It can be seen from the above patent applications that the watermark image block is directly served as the zone to be embedded in the first of the patent applications mentioned above; the zone of the binary text image is grouped as the zone to be embedded, i.e., the watermark image block, in the second of the patent applications mentioned above; and the grouped valid character zone in the text image is served as the watermark image block in the third of the patent applications mentioned above. In the above patent applications, the watermark is embedded through changing the number of black pixels in the watermark image block, and the watermark is extracted through quantifying the number of black pixels in the watermark image block.

Therefore, the above methods are based on two premises.

Premise 1. The partitioning results of characters shall be correct. Nowadays, the algorithms for partitioning characters generally depend on the character recognition results of the OCR (Optical Character Recognition) system. However, the OCR mechanism generally is not used in the digital watermark system in consideration of the recognition speed and efficiency of the OCR system. Moreover, there is a certain error rate when the OCR system recognizes the touched western language characters; and Premise 2. The variation range of the number of black pixels in the watermark image block is not very large. For example, in a Chinese character document, a Chinese character is served as a watermark image block. The Chinese characters are presented in block form and the area difference between each Chinese character is small. Accordingly, the variation range of the number of black pixels in the watermark image block is not very large, and thus the accuracy of embedding and extracting the watermark can be ensured.

However, the above methods are not suitable for the western language documents due to the following problems.

a). The touching between adjacent western language characters occurs frequently before and after printing of the western language characters, and thus it can be difficult to ensure the characters (for example, "mn", "tt" or the like) are consistently partitioned before and after print-and-scan. Given that a single western language character is served as a watermark image block, the touching between characters will necessarily influence the resynchronization of the partitioning sequence for the character image block before and after the watermark is embedded and extracted, and thus will necessarily influence the success rate for embedding and extracting the watermark.

b). The length difference between different words in a western language is relatively large, and thus the variation range of the number of black pixels in the watermark image block tends to be large. For example, in the phrase "My extraordinary power", the length difference between words is significant. If a word is served as a watermark image block, the difference in the number of black pixels in the watermark image block will be very instable, and thus it is impossible to carry out the watermark processing.

c). The change in the font size for western language characters leads to a change in the size of the characters. For example, the difference in the number of black pixels included in "Here" and "Here" is very large. And thus it is needed to apply various quantitative methods to documents with various font sizes.

Therefore, for the western language characters, the following conditions need to be satisfied in order to obtain the watermark image block:

1. the effects from the desynchrony of the watermark image caused by the touched characters shall be avoided;
2. the difference on the number of black pixels in the watermark image shall be small; and
3. for different font sizes of documents, the watermark image blocks shall be adaptively partitioned according to different sizes.

SUMMARY

The application intends to provide methods and devices for partitioning a watermark image with western language characters, so as to address the problem in the prior art, i.e., the watermark image is difficult to be partitioned correctly.

One aspect of the application provides a method for partitioning a watermark image with western language characters, comprising:

partitioning a western language characters image along rows and columns to form a plurality of character image blocks;

identifying valid character image blocks from the formed character image blocks;

counting sizes of the valid character image blocks to determine if the image corresponds to a document with a large font size or a small font size;

dividing words in the image into a plurality of groups, wherein each divided group in the document with large font size has different numbers of words from that with small font size; and dividing equally the divided word groups into multiple portions corresponding to watermark image blocks.

Another aspect of the application provides a device for partitioning a watermark image with western language characters, comprising:

a partitioning module configured to partition a western language characters image along rows and columns to form a plurality of character image blocks;

an identifying module configured to identify valid character image blocks from the formed character image blocks;

a statistic module configured to count sizes of the valid character image blocks to determine if the western language characters image has a large font size or a small font size;

a dividing module configured to divide words in the image into a plurality of groups, wherein each divided group for the document with large font size has different numbers of words from that with small font size; and an equally dividing module configured to equally divide the divided word groups into multiple portions corresponding to watermark image blocks.

Through the above discussed method and device, the watermark image blocks can be reasonably provided based on the sizes of characters, so that the problem, i.e., the watermark image is difficult to be partitioned correctly, can be addressed, which ensures the operability of watermark embedding process.

BRIEF DESCRIPTION OF THE DRAWINGS

The following drawings will help the skilled in the art to further understand the present invention, and are a part of the present invention. The exemplary embodiments and description thereof are used to explain the present invention rather than limit the present invention.

FIG. 8C is a diagram illustrating the watermark image block after the print-and-scan of the document with small font size having abnormal space distance and some touched characters, according to an embodiment of the present application.

FIG. 8D is a diagram illustrating the watermark image block formed from a document with a large font size, according to an embodiment of the present application.

FIG. 8E is a diagram illustrating the watermark image block after the print-and-scan of the document with large font size, according to an embodiment of the present application.

DETAILED DESCRIPTION

Hereinafter, the embodiments of the present application will be described in detail with reference to the drawings.

Figure 1:
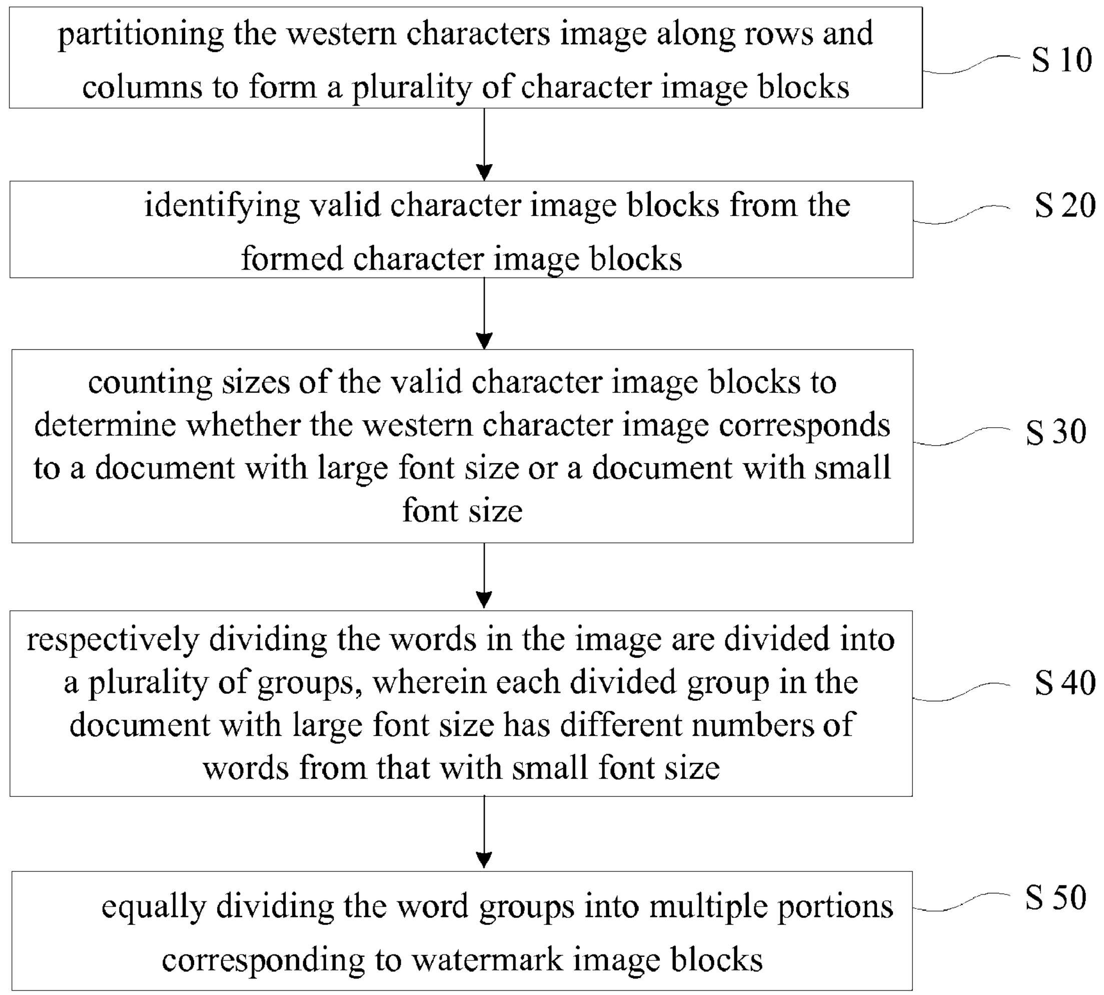
FIG. 1 is a flowchart illustrating the method for partitioning a watermark image with western language characters, according to an embodiment of the present application.

FIG. 1 is a flowchart illustrating the method for partitioning a watermark image with western language characters according to an embodiment of the present application. The method comprises:

A step S10, in which western character image is partitioned along rows and columns to form a plurality of character image blocks;

A step S20, in which valid character image blocks is identified from the formed character image blocks;

A step S30, in which it performs a statistic on sizes of the valid character image blocks to determine whether the western character image corresponds to a document with large font size or a document with small font size;

A step S40, in which the words in the image are divided into a plurality of groups, wherein each divided group in the document with large font size has different numbers of words from that with small font size; and A step S50, in which the word groups are equally divided into multiple portions corresponding to watermark image blocks.

The above embodiment performs the statistics on sizes of the valid character image blocks by taking into account the features of western character words that have been partitioned along rows and columns under different font sizes, so as to differentiate the document with the large font size from that with the small font size. The documents are divided into groups by adaptively using various numbers of words, so that the difference between the numbers of the black pixels in the obtained watermark image blocks is smaller, and thus the operability of watermark embedding process can be ensured.

In addition, the word groups are equally divided into multiple portions in this embodiment, which takes into account inconsistencies of the gaps between characters before and after printing, so that the expanding spacing characters and indenting spacing characters can be adjusted properly. And thus, the consistent partitioning for the characters before and after print-and-scan can be ensured, so that the resynchronization of the watermark image and the robustness of the process for embedding and extracting a watermark are improved.

Preferably, before the step S10, the method further comprises a step of obtaining the western language character image so as to perform a de-noising process on the obtained image to obtain a binary image. This step is a preprocessing step for the western language character image, which is easily realized with a computer. In this preferable embodiment, a better western language binary image can be obtained through the de-noising process.

Preferably, the step S20 comprises a step of differentiating the formed character image blocks into punctuation image blocks and valid characters image blocks. The western language text mainly comprises punctuation and letters. The punctuation is generally small and not suitable for being embedded within the watermark. In this preferable embodiment, the character image blocks are differentiated into punctuation image blocks and valid characters image blocks in order to exclude the punctuations.

Preferably, the step of differentiating image blocks into punctuation image blocks and valid characters image blocks comprises a step of judging whether or not the following conditions are satisfied:

Condition 1: $w > N_{t1} \times H$;

Condition 2: both of a top edge and a bottom edge of U fall into one side of m;

Condition 3: the top edge and bottom edge of U respectively fall into two sides of m, and $w < N_{t2} \times H$;

where, U is a circumscribed rectangular box of a character image block in a collection Ω for character image blocks; H is a row height of the row where U is located; m is center line level of the row; h and w respectively are a height and a width of U; and both of $N_{t1}$ and $N_{t2}$ are preset coefficients.

If any one of the above three conditions is satisfied, it is determined that each of the formed character image blocks, which correspond to U, is a punctuation image block. If none of the above three conditions is satisfied, it is determined that each of the character image block corresponding to U is a valid character image block.

This embodiment provides a specific numeralization determining process which is suitable for being realized with a computer.

Preferably, $N_{t1}=4$ and $N_{t2}=0.35$, which are the optimum coefficients obtained by the inventor through a large number of tests. Certainly, the coefficients also can be set within a range around the above mentioned values, which is within the scope of the present invention.

Preferably, the step S30 comprises a step of calculating $$Hs = \frac{h_1 + h_2 + \ldots + h_m}{m},$$

where $h_1, h_2, \ldots, h_m$ respectively represent heights of valid character image blocks 1, 2, . . . , m in the row.

The step S30 further comprises a step of determining that the row is a row with large font size if $Hs \geq Th_{size}$, where the $Th_{size}$ is a preset threshold. If $Hs < Th_{size}$, the row has a small font size. And then the number $N_{large}$ of the row with large font size and the number $N_{small}$ of the row with small font size will be counted respectively. If $N_{large} \geq N_{small}$, it is determined that the western language character image is corresponding to the document with large font size; otherwise, the western language character image is corresponding to the document with small font size if $N_{large} < N_{small}$.

This embodiment provides the specific numeralization determining process which is suitable for being realized with a computer.

Preferably, $Th_{size}$=88, which is the optimum threshold obtained by the inventor through a large number of tests. Certainly, the threshold also can be set within a range around 88 in accordance with the teaching of the present invention.

Figure 2:
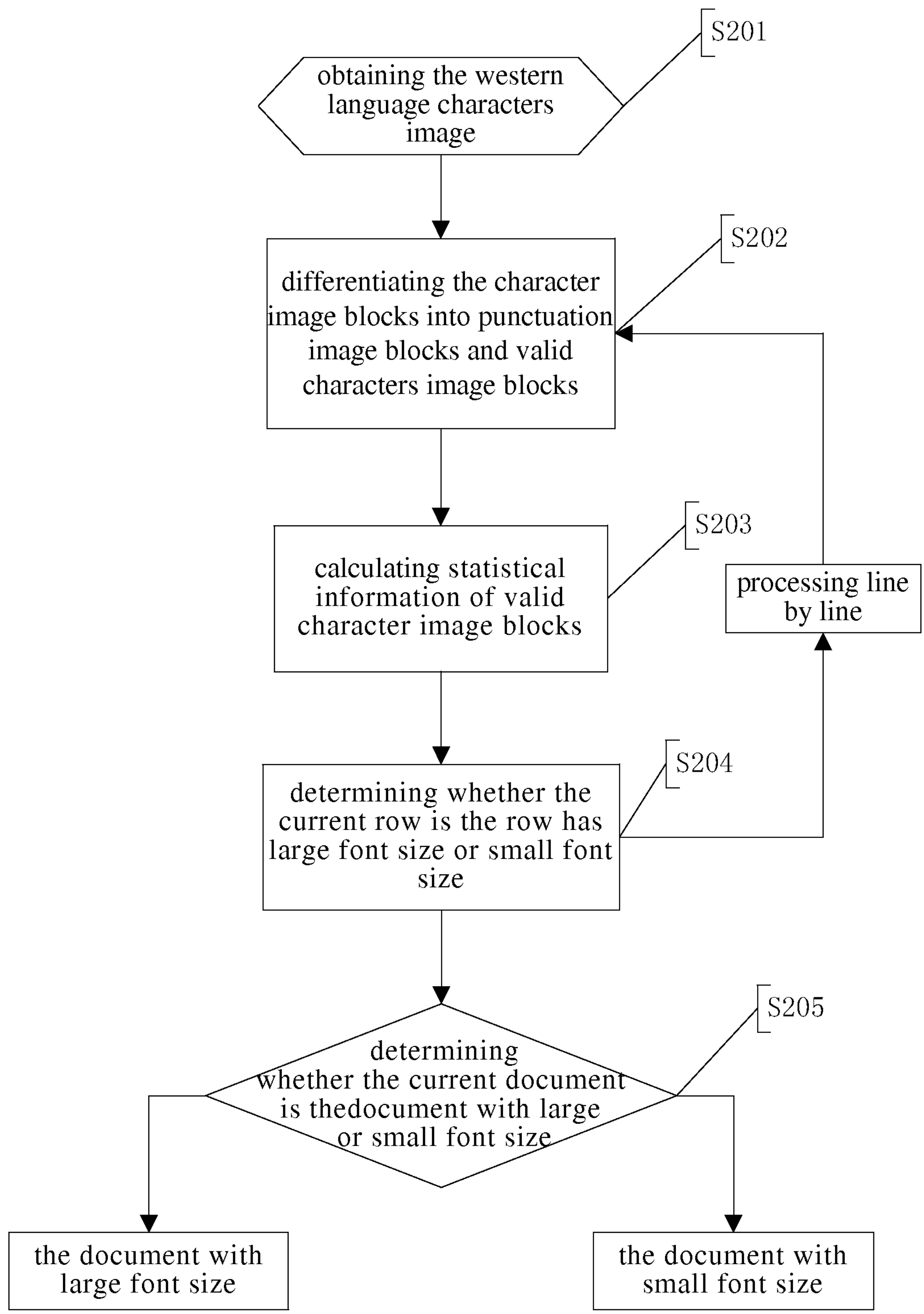
FIG. 2 is a flowchart illustrating a method for determining if a document has large or small font size, according to an embodiment of the present application.

FIG. 2 is a flowchart illustrating a method for determining if a document has large or small font size according to an embodiment of the present application. In this embodiment, the circumscribed rectangular box for one or more characters can be obtained through preliminary partitioning along rows and columns. It is determined whether the row with these characters is the row with large or small font size through the statistics result of these characters, and then it is determined whether the document has the large or small font size. The method for determining comprises the following steps.

Figures 4A, 4B, 5, 6:
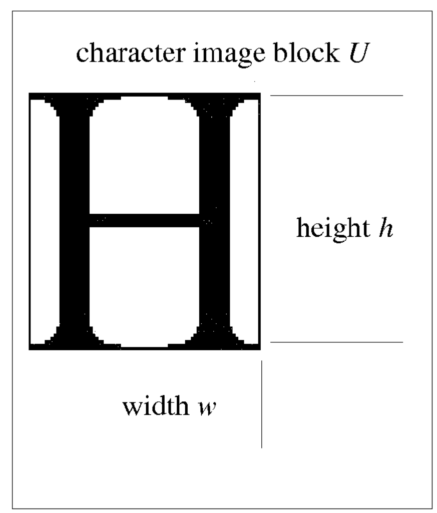
FIG. 4A is a diagram illustrating a row height and a center line of western language binary images, according to an embodiment of the present application.
FIG. 4B is a diagram illustrating a valid character image block of western language binary images, according to an embodiment of the present application.
FIG. 5 is a diagram illustrating partitioning result of western language binary images, according to an embodiment of the present application.
FIG. 6 is a diagram illustrating word groups of western language binary images, according to an embodiment of the present application.

In step S201, the character image blocks are obtained. Specifically, the circumscribed rectangular box for one or more characters can be obtained through preliminary partitioning along rows and columns. As to the collection Ω, as shown in FIG. 4A, H and m respectively are the row height and center line level of the current row. As shown in FIG. 4B, U is a circumscribed rectangular box of one character image block in the collection Ω. h and the w respectively are the height and the width of U.

In Step S202, the image blocks are differentiated into punctuation image blocks and valid characters image blocks. Specifically, if the character image block U meets with any one of the following three conditions, U is determined as a punctuation image block; otherwise, U is determined as a valid character image block.

condition 1: $w>N_{t1}\times H$;

condition 2: both of the top edge and bottom edge of U fall into one side of the center line;

condition 3: the top edge and bottom edge of U respectively fall into different sides of the center line, and $w<N_{t2}\times H$, where, $N_{t1}=4$ and $N_{t2}=0.35$ in general.

The condition 1 is used to screen out punctuation in form of "_", such as an underline; the condition 2 is used to screen out punctuation such as a comma, a full stop and quotation marks; and the condition 3 is used to screen out punctuation in form of "-", such as a hyphen.

It can be readily seen in this step S202 that all of the image blocks are differentiated into two classes, i.e., punctuation image blocks and valid characters image blocks.

In step S203, statistical information of valid character image blocks are calculated. Specifically, the number of the valid character image blocks in the current row is set as m. The valid height Hs of the valid character image blocks in the current row is calculated as follows:

$$Hs = \frac{h_1 + h_2 + \ldots + h_m}{m}$$

where, $h_1, h_2, \ldots, h_m$, respectively are heights of the valid character image blocks 1, 2, . . . , m in the current row.

In step S204, it is determined if the current row has the large or small font size. Specifically, if $Hs \geq Th_{size}$, it is determined that the current row has large font size; otherwise the current row has small font size, wherein the $Th_{size}$=88 in general.

In step S205, it is determined whether the current document is the document with large or small font size. Specifically, the number $N_{large}$ of the row with large font size and the number $N_{small}$ of the with small font size are respectively counted. If $N_{large} \geq N_{small}$, it is determined that the current document is the document with large font size; otherwise the current document is the document with small font size.

Preferably, the step S50 comprises a step of equally dividing the word groups fixed number of portions according to the valid length projected from the column of words; and a step of forming the circumscribed rectangular box of each portion by the width of respective portion and the maximum height of characters included in respective portion, wherein the circumscribed rectangular box is corresponding to a watermark image block.

Figure 3:
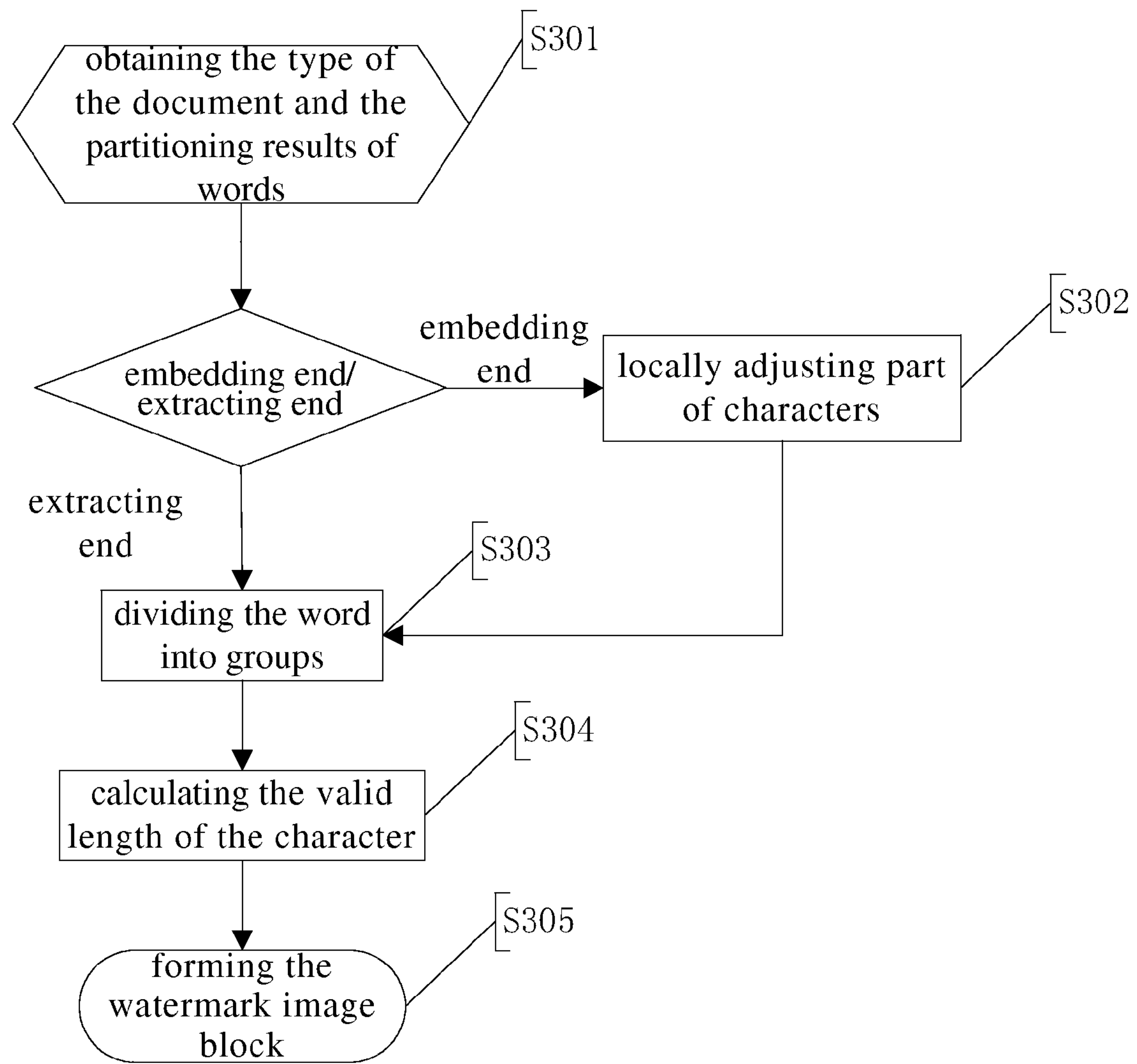
FIG. 3 is a flowchart illustrating a method for dividing valid character zones into groups, according to an embodiment of the present application.

FIG. 3 is a flowchart illustrating a method for dividing valid character zones into groups, according to an embodiment of the present application. In this embodiment, the words in the image are divided into a plurality of groups, wherein each divided group in the document with large font size has different numbers of words from that with small font size. Each word group is equally divided into fixed number of portions according to the valid length projected from the column of words, and a new circumscribed rectangular box for each portion is formed by its width and the maximum height of characters included in the portion, wherein the circumscribed rectangular box is corresponding to a watermark image block, and then the grouping of valid portions can be finished. Specifically, the method for grouping comprises the following steps.

Figure 9:
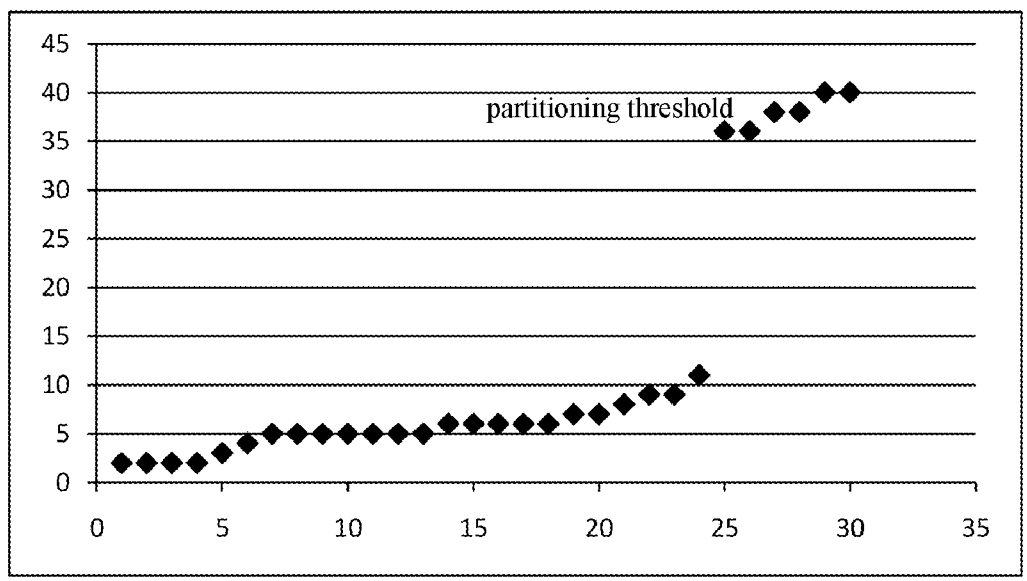
FIG. 9 is a diagram illustrating the partitioning threshold in the partitioning process of words, according to an embodiment of the present application.

In step S301, the type of the document (i.e., the document with large or small font size) and the partitioning results of the words are obtained. Specifically, the type of the document can be determined as discussed in the step S30. As to the partitioning for words, it comprises a step of ranking, in ascending order, the distances between the circumscribed rectangular boxes of adjacent valid characters in the same row. It can be regarded that this ranked order comprises two types of data, wherein one type of data is the distances between characters in a word, and the other one is the distances between words. Obviously, the distance between words is greater than the distance between characters within a word. As shown in FIG. 9, a partitioning threshold is selected from the ranked order to differentiate the above two types of data. And thus, the key of the partitioning for words is to obtain an exact and stable partitioning threshold.

The above two types of data in the order can be differentiated through an image binarization method, such as Otsu method or two-peak method. Additionally, in view of the statistical characteristic, i.e., both of the variance for the values at the right and left of the partitioning threshold should be smaller, the best partitioning threshold can be obtained through determining the point in the order, on which the sum of the variances for the values on the right and on the left is smallest. After the partitioning threshold is obtained, the character image blocks corresponding to the distances which are smaller than the partitioning threshold are combined as a word. As a result, the partitioning results for words as shown in FIG. 5 can be obtained.

In step S302, a part of characters is adjusted locally. The character image blocks corresponding to the distances being similar to the partitioning threshold are classed as expanding spacing characters. The character image blocks, which correspond to the distances being obviously smaller than the partitioning threshold and touch phenomenon easily occurs between them after printing, are classed as indenting spacing characters. According to properties of the obtained character image blocks, the corresponding characters in the original characters order in the original document are moved. The expanding spacing characters are moved towards the right, and all contents at the right side of the expanding spacing characters are moved toward the right. The indenting spacing characters are moved towards the left, and all contents at the left side of the indenting spacing characters are moved towards the left.

In step S303, the words are divided into groups. As shown in FIG. 6, for the document with large font size and the document with small font size, the word groups G are formed, each of which has different numbers of words from another. Generally, $N_{t3}$ number of words are combined as a group for the document with large font size, and the $N_{t4}$ number of words are combined as a group for the document with small font size. In general, $N_{t3}=3$ and $N_{t4}=4$.

Figures 7A, 7B, 8A, 8B:
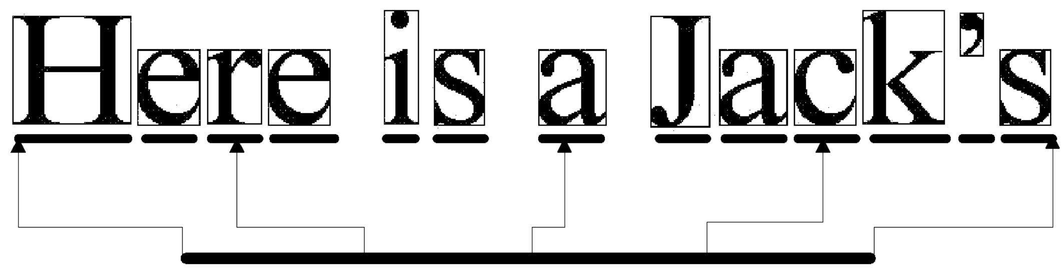
FIG. 7A is a diagram illustrating calculation for the effective length of characters included in each word groups, according to an embodiment of the present application.
FIG. 7B is a diagram illustrating the obtained watermark image block, according to an embodiment of the present application.
FIG. 8A is a diagram illustrating the watermark image block obtained from a document with small font size, according to an embodiment of the present application.
FIG. 8B is a diagram illustrating the watermark image block after the print-and-scan of the document with small font size, according to an embodiment of the present application.

In step S304, the valid length of the character is calculated. As shown in FIG. 7A, the valid length L of m number of valid character image blocks U in a certain group G is calculate by $$L = \sum_{i=1}^{m} w_i.$$

This group is divided into fixed number S of portions. And thus, the valid Ls of each portion is calculated by Ls=L/S. Herein, the value of S is determined according to the results of the watermark process. For example, in the disclosure of Chinese Application No. 200710121642.7, the value of S is equal to the dimensions of applied Hadamard Matrix. In general, S=4.

In step S305: the watermark image blocks are formed. As shown in FIG. 7B, the character image blocks are divided into multiple parts in accordance with the valid lengths Ls of characters in each part. Meanwhile, a new circumscribed rectangular box is formed for each part by the width of respective part and the maximum height of characters included in respective part, wherein the new circumscribed rectangular box is corresponding to a watermark image block. S watermark image blocks are included in each group. The watermark embedding and extracting process are performed based on the grouped watermark image blocks.

Figures 8C, 8D, 8E:
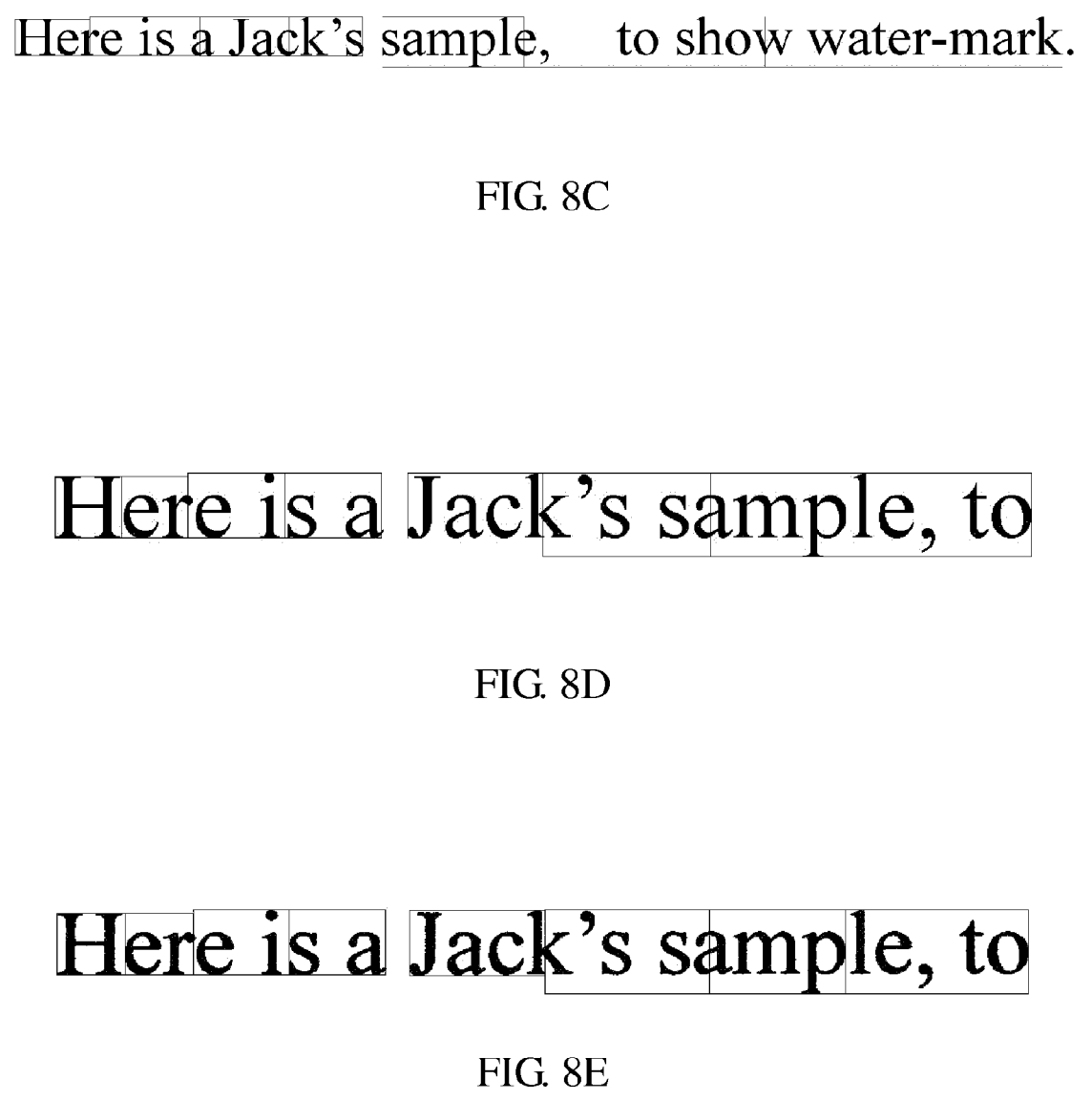

FIGS. 8A and 8B respectively illustrate the watermark image blocks formed from the document with small font size before and after print-and-scan. FIG. 8C illustrates the watermark image block formed from the document with the abnormal space distance and some touched characters. FIGS. 8D and 8E respectively illustrate the watermark image block formed from the document with large font size before and after print-and-scan. It can be seen that the watermark image blocks formed through the method disclosed herein will not be adversely affected by print-and-scan, and can avoid influence from character-touching and the document with various font sizes.

Figure 10:
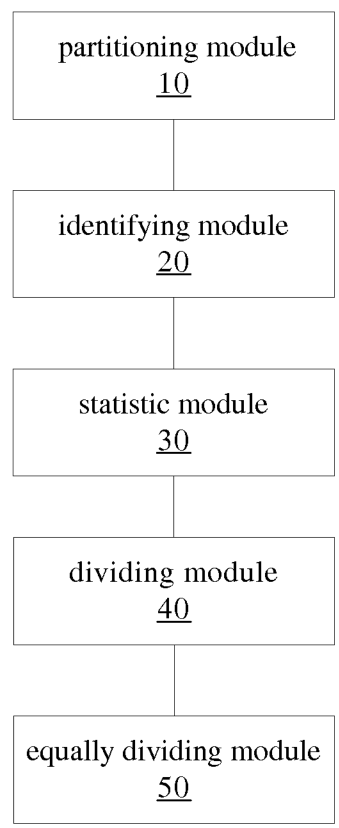
FIG. 10 is a diagram illustrating the device for partitioning a watermark image with western language characters, according to an embodiment of the present application.

FIG. 10 is a diagram illustrating the device for partitioning a watermark image of western language characters according to an embodiment of the present application. The device comprises a partitioning module 10, an identifying module 20, a statistic module 30, a dividing module 40 and an equally dividing module 50.

The partitioning module 10 is configured to partition a western language characters image along rows and columns to form a plurality of character image blocks. The identifying module 20 is configured to identify valid character image blocks from the formed character image blocks. The statistic module 30 is configured to count sizes of the valid character image blocks to determine whether the characters image has large or small font size. The dividing module 40 is configured to divide words in the image into a plurality of groups, wherein each divided group for the document with large font size has different numbers of words from that with small font size. The equally dividing module 50 is configured to equally divide the divided word groups into multiple portions corresponding to watermark image blocks.

In this embodiment, it is possible to embed the watermark, so that the resynchronization of the watermark image and the robustness of the process for embedding and extracting watermark are improved.

Preferably, the identifying module 20 comprises a judging module configured to determine if the following conditions are satisfied:

condition 1: $w>N_{t1}\times H$;

condition 2: both of the top edge and bottom edge of U fall into one side of m;

condition 3: the top edge and bottom edge of U respectively fall into two sides of m, and $w<N_{t2}\times H$;

where, U is a circumscribed rectangular box of a character image block in the collection Ω for character image blocks; H is the row height of the row corresponding to U; the m is center line level of the row corresponding to U; h and w respectively are the height and the width of U; and both of $N_{t1}$ and $N_{t2}$ respectively are preset coefficients.

The identifying module 20 further comprises a determining module configured to determine that each of the formed character image blocks, which corresponds to U, is a punctuation image block if any one of the three conditions is satisfied; otherwise each of the character image block corresponding to U is a valid character image block.

Preferably, the statistic module 30 comprises a calculating module configured to calculate Hs by rule of $$Hs = \frac{h_1 + h_2 + \ldots + h_m}{m},$$

wherein $h_1, h_2, \ldots, h_m$ respectively are heights of valid character image blocks 1, 2, . . . , m in the row corresponding to U.

The statistic module 30 further comprises a row determining module, a counting module, and a document determining module. The row determining module is configured to determine that the row has large font size if $Hs\geq Th_{size}$, and to determine that the row has small font size if $Hs<Th_{size}$, wherein the $Th_{size}$ is a preset threshold. The counting module is configured to make statistics on the number $N_{large}$ of the row with large font size and the number $N_{small}$ of the with small font size. The document determining module is configured to determine that the western language character image is corresponding to the document with large font size if $N_{large}\geq N_{small}$, and to determine the western language character image is corresponding to the document with small font size if $N_{large}<N_{small}$.

It can be seen from the above that the device disclosed by the embodiment can improve the accuracy of extracting the watermark for the characters image. In the solution disclosed by the application, it takes into account the fact that different font sizes of western character words will have different features after being partitioned along rows and columns so as to obtain a threshold for differentiating the document with the large font size from the document with the small font size. And thus the type of the current document can be determined, i.e., the document with the large or small font size. The different types of documents respectively are divided into groups with different numbers of words, so that the difference between the numbers of the black pixels in the grouped watermark image blocks is smaller, and thus the robustness of watermark embedding process can be improved. In the application, it also takes into the inconsistent gap between characters before and after printing, and thus when the watermark is embedded, the distances between characters in a word being similar to the threshold will be adjusted finely in accordance with the local features of the partitioning threshold. Accordingly, it ensures the consistent partitioning for the characters before and after print-and-scan, so that the resynchronization of the watermark image and the robustness of the process for embedding and extracting watermark are improved.

It is understood that a person skilled in the art should understand that the above modules and steps can be realized through universal computer devices which may be integrated into single computer device or distributed on a network constituting of a plurality of computer devices. Optionally, the above modules and steps can be realized by program code which is executable by the computer devices, so that they can be stored in a memory to be executed by the computer devices; or the above modules and steps can be respectively made into respective integrated circuit modules; or a plurality of modules or steps of the above modules and steps can be made into single integrated circuit module. Therefore, the present invention is not limited by certain hardware, software and/or their combination.

Embodiments and implementations of the present application have been illustrated and described, and it should be understood that various other changes may be made therein without departing the scope of the application.

What is claimed is:

1. A method for partitioning a watermark image with western language characters, comprising:

partitioning a western language characters image along rows and columns to form a plurality of character image blocks;

identifying valid character image blocks from the formed character image blocks;

counting sizes of the valid character image blocks to determine if the image corresponds to a document with a large font size or a small font size;

dividing words in the image into a plurality of groups, wherein each divided group in the document with large font size has different numbers of words from that with small font size; and dividing equally the divided word groups into multiple portions corresponding to watermark image blocks.

2. The method according to claim 1, wherein the step of identifying comprises:

differentiating the formed character image blocks into punctuation image blocks and valid characters image blocks.

3. The method according to claim 2, wherein the step of differentiating comprises:

judging if following conditions are satisfied:

condition 1: $w>N_{t1}\times H$;

condition 2: both of a top edge and a bottom edge of U fall into one side of m;

condition 3: the top edge and bottom edge of U respectively fall into two sides of m, and $w<N_{t2}\times H$;

where, U is a circumscribed rectangular box of a character image block in a collection Ω for character image blocks; H is a row height of the row where U is located; m is a center line of the row; h and w respectively are a height and a width of U; and both of $N_{t1}$ and $N_{t2}$ are preset coefficients, determining that each of the formed character image blocks, which corresponds to U, is a punctuation image block if any one of the three conditions is satisfied; otherwise determining that each of the character image blocks corresponding to U is a valid character image block.

4. The method according to claim 3, wherein $N_{t1}=4$ and $N_{t2}=0.35$.

5. The method according to claim 3, wherein the step of counting comprises a step of calculating Hs by rule of $$Hs=\frac{h_1+h_2+\ldots+h_m}{m},$$

where, $h_1, h_2, \ldots, h_m$ respectively are heights of the valid character image blocks 1, 2, . . . , m in the row;

determining that the row has large font size if $Hs\geq Th_{size}$;

determining that the row has small font size if $Hs<Th_{size}$, where $Th_{size}$ is a preset threshold;

counting the number $N_{large}$ of the row with large font size and the number $N_{small}$ of the row with small font size;

determining that the image corresponds to the document with large font size if $N_{large}\geq N_{small}$; and determining that the image corresponds to the document with small font size if $N_{large}<N_{small}$.

6. The method according to claim 5, wherein $Th_{size}=88$.

7. The method according to claim 1, wherein the step of dividing equally the divided word groups comprises:

dividing equally the word groups into fixed number of portions according to a valid length projected from a column of words in the word groups; and forming a circumscribed rectangular box of each of the portions by its width and maximum height of characters included in each of the portions, wherein the circumscribed rectangular box corresponds to the watermark image block.

8. The method according to claim 1, wherein, before the step of partitioning, the method further comprises:

obtaining the western language characters image; and de-noising the obtained image to form a binary image.

9. A device for partitioning a watermark image with western language characters, comprising:

a partitioning module configured to partition a western language characters image along rows and columns to form a plurality of character image blocks;

an identifying module configured to identify valid character image blocks from the formed character image blocks;

a statistic module configured to count sizes of the valid character image blocks to determine if the western language characters image has a large font size or a small font size;

a dividing module configured to divide words in the image into a plurality of groups, wherein each divided group for the document with large font size has different numbers of words from that with small font size; and an equally dividing module configured to equally divide the divided word groups into multiple portions corresponding to watermark image blocks.

10. The device according to claim 9, wherein the identifying module comprises a judging module configured to determine if following conditions are satisfied:

condition 1: $w>N_{t1}\times H$;

condition 2: both of a top edge and a bottom edge of U fall into one side of m;

condition 3: the top edge and bottom edge of U respectively fall into two sides of m, and $w<N_{t2}\times H$;

where, U is a circumscribed rectangular box of a character image block in a collection Ω for character image blocks; H is a row height of the row where U is located; m is a center line of the row; h and w respectively are a height and a width of U; and both of $N_{t1}$ and $N_{t2}$ are preset coefficients, a determining module configured to determine that each of the formed character image blocks, which corresponds to U, is a punctuation image block if any one of the three conditions is satisfied; otherwise each of the character image blocks corresponding to U is a valid character image block.

11. The device according to claim 10, wherein the statistic module comprises a calculating module configured to calculate Hs by rule of $$Hs = \frac{h_1 + h_2 + \ldots + h_m}{m},$$

where, $h_1, h_2, \ldots, h_m$ respectively are heights of the valid character image blocks 1, 2, . . . , m in the row;

a row determining module configured to determine that the row has large font size if $Hs \geq Th_{size}$, otherwise the row has small font size, where the $Th_{size}$ is a preset threshold;

a counting module configured to count the number $N_{large}$ of the row with large font size and the number $N_{small}$ of the row with small font size; and a document determining module configured to determine that the western language character image corresponds to the document with large font size if $N_{large} \geq N_{small}$, and to determine the western language character image corresponds to the document with small font size if $N_{large} < N_{small}$.

* * * * *